July 12, 1955  R. A. PETERSON  2,712,873
PIPE LAYING TRACTOR
Filed Nov. 22, 1949  5 Sheets-Sheet 1
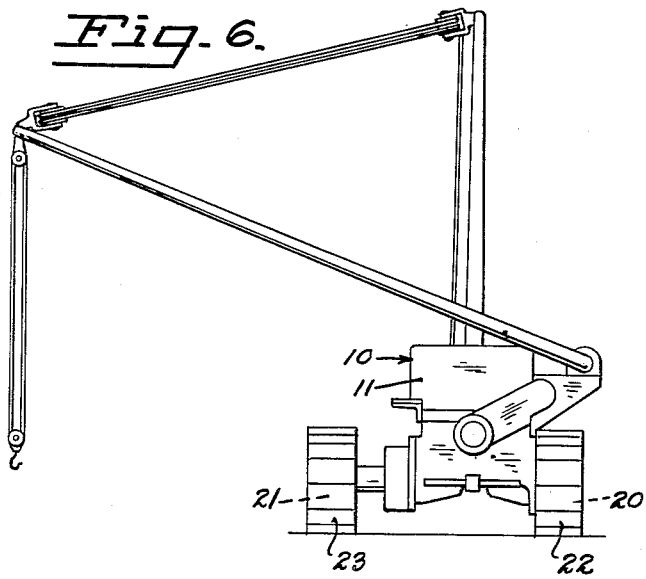
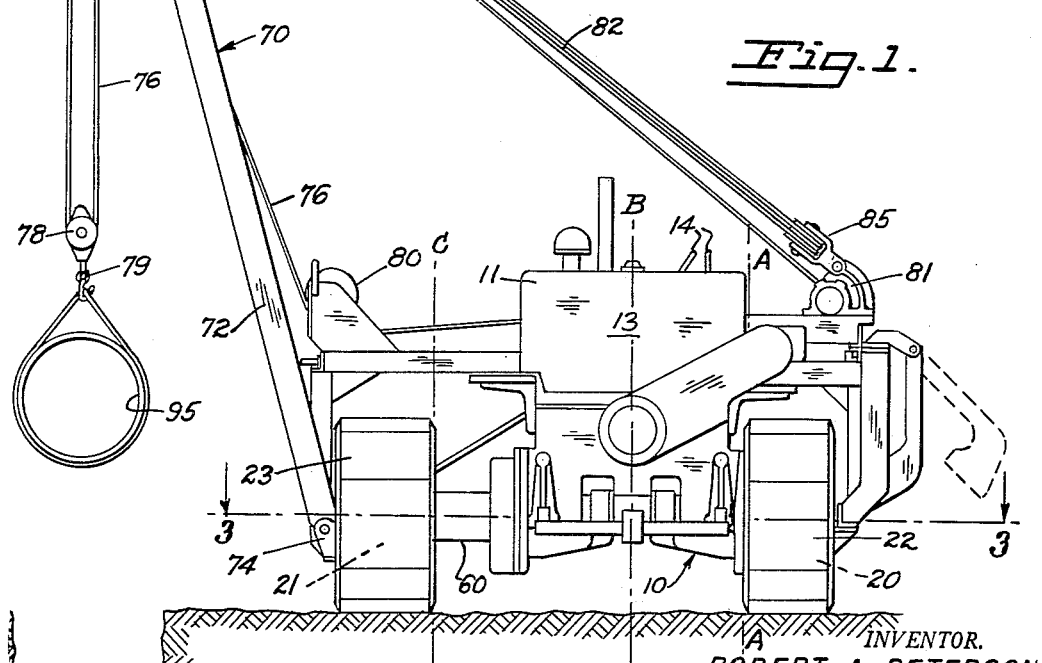
INVENTOR.
ROBERT A. PETERSON
BY
ATTORNEY

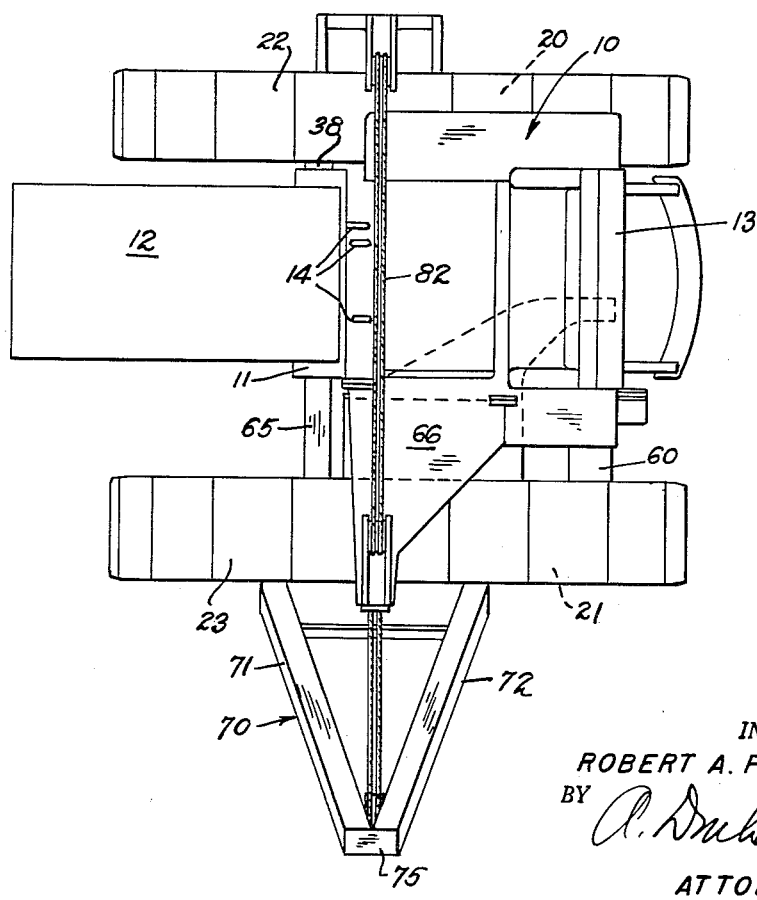

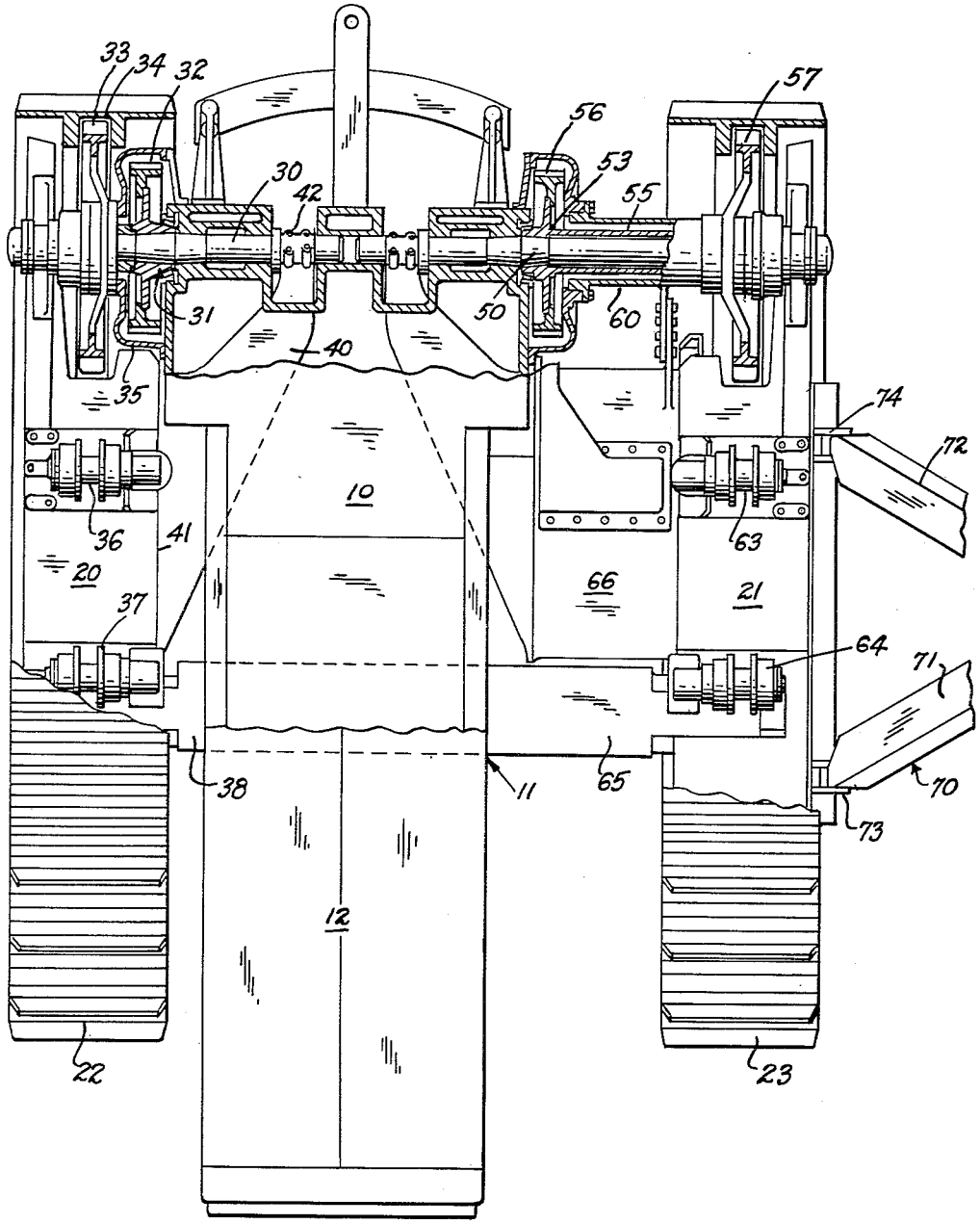

July 12, 1955

R. A. PETERSON 2,712,873

PIPE LAYING TRACTOR

Filed Nov. 22, 1949

INVENTOR.
ROBERT A. PETERSON
BY
ATTORNEY

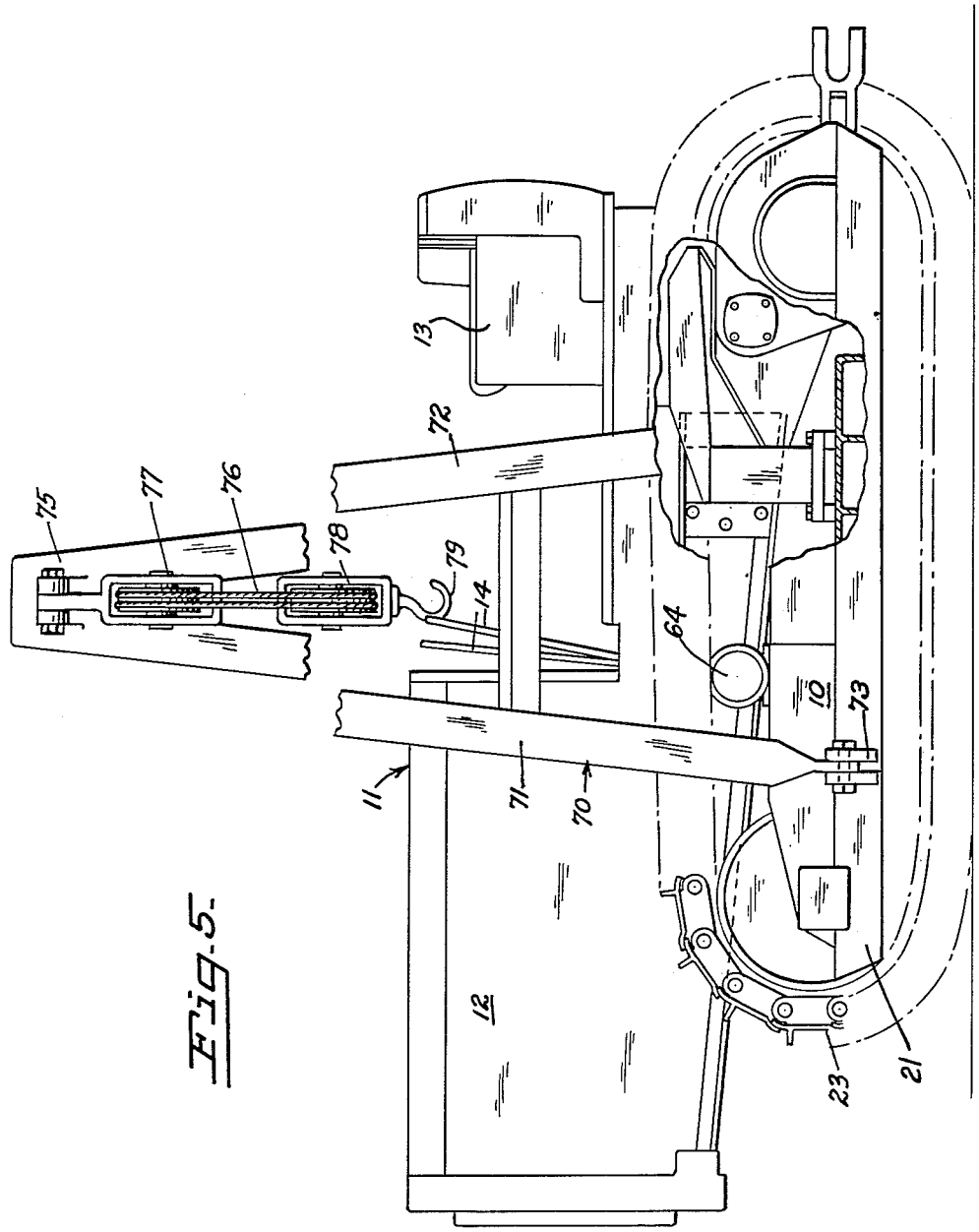

United States Patent Office 2,712,873
Patented July 12, 1955

2,712,873

PIPE LAYING TRACTOR

Robert A. Peterson, San Leandro, Calif., assignor to Caterpillar Tractor Co., Peoria, Ill., a corporation of California Application November 22, 1949, Serial No. 128,839

3 Claims. (Cl. 212—8)

This invention relates to an improved tractor of the type having a side boom for lifting, carrying, and lowering objects at one side of the tractor.

Tractors of this general type are widely used for transporting and laying in place sections of large-diameter pipe, such as the so-called "big inch" pipes that carry oil and natural gas from the wells to the cities. Often a caravan of such tractors is used to carry a single long section of such pipe and deposit it as a unit in a trench.

The only practical location for the boom is at one side of the tractor. This has meant that the full carrying capacity of the tractor could not be utilized, because when the weight of the pipe exceeds a certain proportion of the weight of the tractor, the tractor will be overbalanced and will tip over on its side. The weight which will overbalance a tractor is substantially less than the weight which the tractor would be capable of carrying if the weight were not all to one side. Once the overbalancing weight has been reached the tractor's usefulness ceases. Thus the potential carrying capacity of the tractor is never fully utilized.

Many attempts at solving this problem have been made. One was by securing large counterweights to the side of the tractor opposite the boom to balance the weight on the boom side. This did some good, but was not a satisfactory solution because of the loss due to the weight of the counterweight which subtracted that much from the tractor's carrying capacity. Also, the counterweighted tractor would be out of balance before its full carrying capacity could be utilized. As pipes to be handled have become larger and heavier they have gone far beyond the ability of the counterbalanced tractor to maintain itself in equilibrium. Another solution has been to use much larger and heavier tractors. These are very expensive and they become considerably more expensive in proportion as their size increases. Today the pipes to be handled have become so heavy that were it not for the present invention, very large specially build mobile lifting devices would have to be designed.

The present invention solves the problem in a manner that may be variously expressed but basically it involves adding no substantial weight to the tractor itself but calls for a redistribution of existing weight in relation to the supporting wheels or tracks. The wheels or tracks are spaced farther apart and the tractor engine and frame are set close to the wheels or tracks on one side and well apart from the wheels or tracks on the other side. Obtaining such a long sought result without adding materially to the tractor's weight is a great advantage. It enables utilization of a larger percentage of the carrying capacity of a tractor by redistributing the weight of the tractor and thus providing a tractor that is not easily overbalanced. In this way a considerable increase in effective side-carrying capacity can be achieved at a minimum cost. The structure of the present invention may be incorporated into already-existing tractors or into new tractors as they are built. The effective side capacity of any tractor can be increased around 50% or even more, at an increase of only about 5% or 10% over the original cost of the tractor.

What the present invention does is to provide an asymmetrical tractor. The supporting track or wheel means on the boom side of the tractor is spaced much farther from the tractor body than is the track or wheel means on the other side of the tractor. This moves the center of gravity of the unloaded tractor adjacent to the closer track, instead of halfway between the tracks as on the prior art tractors.

The present invention does not bar use under extreme conditions of the prior art counterweights but it provides a lifting vehicle which will handle without counterweights, loads formerly impossible without them. The tractor of the present invention can carry much heavier loads before it is overbalanced.

Not only does this shift in weight counteract overbalancing, another advantage is the additional leverage which the tractor can get on the pipe, because the angle between the cable and the boom is greater.

By incorporating this invention into a typical-tractor and shifting the tread on the boom-side out only twenty-two inches the capacity of one tractor was increased from approximately 57,000 pounds to approximately 80,000 pounds. The alteration was made at a cost of $1,500 on a $12,000 stock tractor. The installation cost may be reduced about two-thirds by incorporating the invention into the tractor during manufacture.

Other advantages and objects of the invention will appear from the following description of a preferred form thereof. This detailed description is not intended to narrow the invention beyond the scope of the claims.

In the drawings:

Fig. 1 is a view in elevation looking at the rear of a tractor embodying the principles of the invention. The tractor is shown holding a pipe above a trench where it is to be deposited.

Fig. 2 is a top plan view of the tractor shown in Fig. 1.

Fig. 3 is an enlarged plan view, partly in section along the line 3—3 in Fig. 1, showing in more detail the parts which are extended; to conserve space, the top of the boom has been broken away.

Fig. 5 is a view in side elevation on the scale of Fig. 3, looking at Fig. 3 from the right. The boom has been broken away in order to conserve space while showing the tractor on a relatively large scale.

Fig. 6 is a diagrammatic view showing how the boom may be hinged to the tractor at a point opposite to what it is in Fig. 1.

Figure 4:
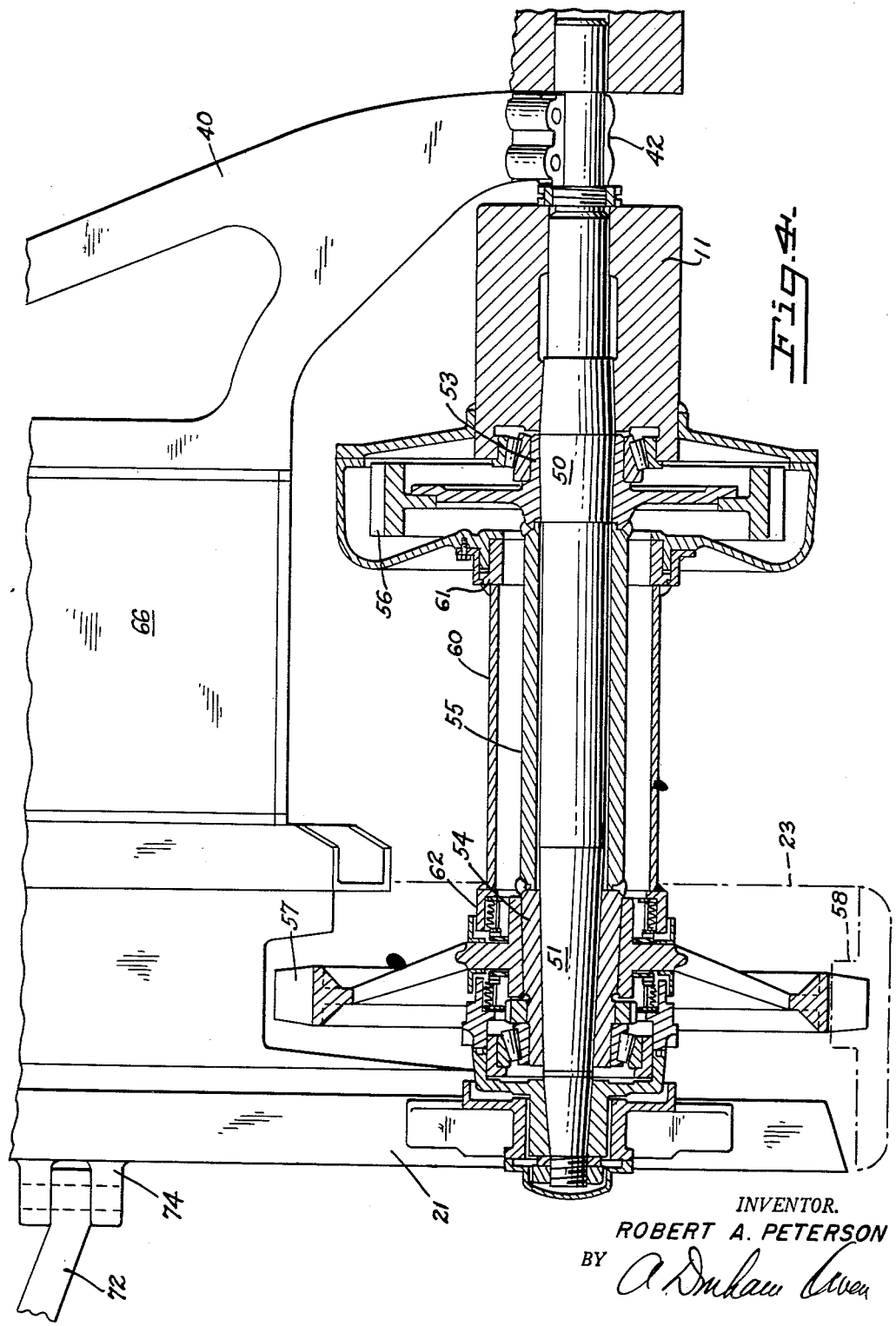
Fig. 4 is a further enlarged plan view of a portion of Fig. 3, showing in more detail the axle that drives the offset track on the boom side of the tractor.

The tractor 10 shown in the drawings, and now to be described, is substantially a standard track-laying type, with a side boom or crane as improved by incorporating into it the present invention. The invention applies to any tractor and any crane and is not limited to those illustrated here in describing the invention. Since these are both well known devices in this art it will not be necessary to describe in great detail the tractor parts, except as they are directly concerned by or are changed by this invention.

The tractor 10 includes a body member 11 which supports an engine 12, a seat 13 for the operator, and standard controls 14 for operating both the movement of the tractor and the raising and lowering of the crane boom. The body 11 and all its associated parts are basically the same on most tractors.

On each side of the body 11 are mobile means for advancing the tractor 10 over the ground. In the form here illustrated these mobile means include a pair of endless tracks 22 and 23. Wheels may be used in place of the tracks. The track frame 20 is positioned at the usual location closely adjacent the body. The track frame 21, however, is offset a substantial distance away from the body 11, and its axle and supporting members are correspondingly extended. This offset makes the tractor asymmetrical, shifts the balance of the tractor so that the center of gravity is near the closer track frame 20, and enables more effective use of the tractor's weight.

Another way of expressing this is to say that the track frames 20 and 21 are spaced farther apart than is usual and the body 11 is then set closer to the track 22 than to the track 23. The crane extends out beyond the track 23.

While I have shown the parts arranged so the crane extends out beyond the track 23, all the parts may be reversed so that the body 11 is set close to the track 23 and the crane is set to extend out beyond the track 22.

This asymmetrical construction may be achieved in many different ways. The drawings show one practical way of doing this. Here the axle, axle housing, brace, and steadying members on one side of the tractor 10 are all lengthened, so that the track 23 is shifted over about two feet further out from the body than the track 22. Otherwise, the track frame 21, track 23, and all its assembled parts remain unchanged.

A comparison of the two sides of the tractor 10, referreing to Figs. 3 and 4, will illustrate what can be done. Before rebuilding the tractor to achieve the present invention, the tractor was symmetrical. In other words, both sides were like the left-hand side of Fig. 3, with both track frames and both tracks positioned close to the body 11.

The drive and connecting links for the track 22 and its frame 20 include a stationary, solid, tapered central supporting shaft 30. Around this motionless shaft 30 moves a tapered tubular drive axle 31. At its inner end the axle 31 receives its drive from the driven gear 32. It transmits this drive to the sprocket wheel 33 secured to its outer end. The sprocket's teeth engage openings 34 in the track 22 and propel the track. The axle 31 and its gear 32 are contained in a housing 35, which protects them from dust. Idler wheels 36 and 37 along the frame 20 help support the track 22. At the other end of the frame 20 a brace 38 connects the body 11 to the frame 20. In between the shaft 30 and the brace 38 is a broad flaring brace member 40. Its wider end 41 is secured to the frame 20, and its narrow inner end 42 is secured around the stationary axle 30. The invention may be practiced on tractors where the tracks are free to oscillate, as well as where the tracks are fixed in relation to each other.

Figs. 3 and 4 show the changes which may be made in the offset side of the tractor. What would be the solid shaft 30 has been lengthened and has the two tapered end pieces 50 and 51. Similarly what would otherwise be the tubular drive axle 31, is split into tapered end sections 53 and 54, and a center cylindrical portion 55 is welded between to unite them. The gear 56 and sprocket 57 secured at opposite ends of the axle operate just like the gear 32 and sprocket 33 previously described to transmit the drive from the transmission to the openings 58 in the track 23. What would be the housing 35 on the other side is split, and a tubular sleeve 60 is welded between the inner housing end 61 and the outer housing end 62.

Idler wheels 63 and 64 help support the track 23. An extended front brace 65 may be a new integral member or it may be a member like the brace 38 having an extension piece welded to it similar to that used with the axle 30. The brace 66 may also be extended in a similar way or it may be a new piece of the desired dimensions.

The boom 70 (see Figs. 1 and 2) may comprise two arms 71 and 72 pivoted on brackets 73 and 74 adjacent the offset track frame member 21. The arms converge at the upper end 75. To get the benefit of the invention, the boom is located on the offset side. A lifting cable 76 passes over a block 77 which is suspended from the upper end 75 of the boom 70. It is run around the lower block 78 which supports suitable tackle 79. The cable 76 runs under a pulley 80 and across the frame 11 to a winch 81 on the other side of the tractor.

A second cable 82 may be used to lift and lower the boom 70. The winch 81 has another drum that controls the length of the cable 82 between a block 84 at the top of the boom 70 and a block 85 adjacent the winch.

The tractor 10 operates similar to the standard pipelaying tractor, but has greater capacity because it will remain in balance while lifting a heavier load. The winch 81 controls, on separate drums, the length of both cables 76 and 82. In this manner the boom 70 may be raised and lowered and the block 78 may be raised and lowered relatively to the boom 70.

Before pipe 95 is lifted, the center of gravity of the tractor will be about along the line A—A in Fig. 1. How much the resultant center of gravity will shift depends, of course, on the weight of the pipe 95. It may shift over into the vicinity of the center line B—B of the tractor body 11. A very heavy load will shift it over into the vicinity of the line C—C on the other side of the tractor, which is much farther away from the line B—B than is the line A—A. Only a very heavy load will overbalance the tractor. In the normal, symmetrical tractor, the initial center of gravity will be closer to the line B—B at the start, and under a heavy load will shift over beyond the line C—C and will overbalance the tractor.

Due to the offsetting of the boom-side track 23, the moment of the tractor increases in proportionately great amounts as the weight of the pipe moves the center of gravity toward the line C—C. The effective counterbalance of the tractor is increased because the moment is a product of weight and its distance from the center of gravity. Stability will be maintained so long as the center of gravity is between the tracks, because no weight centered in between the tracks can tip over the tractor. Thus, the increasing moment and the spread of the tracks both act to increase stability. The present invention specifies a particular type of asymmetry, with the boom-side track being the one that is offset.

In the tractor shown in the drawings, one track 22 is closely adjacent the body 11; however, the invention includes an arrangement where there is more space between the body and the track so long as the track nearest the working end of the boom is spaced substantially further from the body than the other track.

The diagrammatic sketch in Fig. 6 shows that it is not essential to the present invention for the boom to be pivoted adjacent the track farthest removed from the body member 11. In Fig. 6 the boom is pivoted on the opposite side in relation to what it is in Fig. 1. It is obvious that it may be pivoted at any convenient place on the tractor so long as the working end of the boom projects out over the track which is offset farthest from the body member 11.

Summarized, what this invention includes (see Figs. 1 and 3) is a mobile self-propelled vehicle 10, having mobile support means 22 and 23 on each side; a body portion 11 containing the power plant between the mobile support means 22 and 23; a frame means 35, 38 connecting one mobile support means 22 to the body portion 11 and another frame means 60, 65 connecting the other mobile support means 23 adjacent the other side of the body portion 11; the frame means 60, 65 being wider than the other frame means 35, 38 so that the body portion 11 is supported closer to the mobile means 22 than to the mobile means 23; and with a boom 70 having its base operatively secured to the vehicle 10 adjacent the mobile support means 23 spaced farthest from the body 11; and having rigging 76, 82 mounted on the vehicle 10 and arranged to support the end of the boom 70 in operative position outboard in relation to the mobile support means 23.

I claim:

1. A tractor adapted to raise, carry, and lower heavy objects beyond one edge thereof, comprising a body member including a source of motive power and controls therefor; mobile means extending fore and aft on each side of said body member giving four point support to said body member and on which it is able to be moved over the ground, the fore and aft extending mobile means on one side thereof being spaced close to said body member and the other of said fore and aft extending mobile means being spaced outwardly a substantial distance away from said body member; a boom pivoted to said tractor on said outwardly spaced fore and aft extending mobile means and extending outwardly sidewise beyond the edge of said tractor and said outwardly spaced mobile means; a winch mounted on said tractor and extensible lifting means connecting said boom to said winch.

2. A tractor adapted to raise, lower, and carry heavy objects off one side thereof, comprising a body member including a source of motive power and controls therefor; track-supporting means on each side of said body member, one of said track-supporting means being spaced farther from the fore and aft center line of said body than the other track-supporting means; endless tracks on said track-supporting means, adapted to move around a closed path and thereby advance said tractor; a boom operatively pivoted to said farther-spaced track-supporting means; a winch mounted on the opposite side of said tractor; and extensible lifting means connecting said boom to said winch; the center of gravity of the entire tractor being in close proximity to the closer track so that loads large in proportion to the weight of the tractor can be lifted and carried by the boom when swung outside the farther track.

3. A tractor adapted to raise, lower, and carry heavy objects at one side thereof, comprising a body including a source of motive power and controls therefor; track-supporting means located on each side of said body, one of said track supporting means being spaced farther from the fore and aft center line of said body than the other; an endless track on each said track-supporting means; means to propel said tracks; a boom pivoted to the outside edge of said farther-spaced track-supporting means; a winch mounted on said tractor; and an extensible lifting means connecting said boom to said winch.

References Cited in the file of this patent

UNITED STATES PATENTS

| Number | Name | Date |
|---|---|---|
| 337,462 | Valentine | Mar. 9, 1886 |
| 508,155 | White | Nov. 7, 1893 |
| 849,106 | Castagnos | Apr. 2, 1907 |
| 984,155 | Preston | Feb. 14, 1911 |
| 1,353,841 | Neighbour | Sept. 28, 1920 |
| 1,520,397 | Best | Dec. 23, 1924 |
| 1,606,628 | Gros | Nov. 9, 1926 |
| 1,676,645 | Funk | July 10, 1928 |
| 1,851,346 | Brown | Mar. 29, 1932 |
| 1,877,556 | Clark et al. | Sept. 13, 1932 |
| 1,925,169 | Berg | Sept. 5, 1933 |
| 2,261,870 | Cardwell | Nov. 4, 1941 |
| 2,425,663 | Wooldridge | Aug. 12, 1947 |
| 2,513,942 | Johnson et al. | July 4, 1950 |